United States Patent [19]

Nakajima

[11] Patent Number: 5,018,806
[45] Date of Patent: May 28, 1991

[54] IMAGE FORMING APPARATUS
[75] Inventor: Tomohiro Nakajima, Matsudo, Japan
[73] Assignee: Ricoh Company, Ltd., Tokyo, Japan
[21] Appl. No.: 470,233
[22] Filed: Jan. 25, 1990
[30] Foreign Application Priority Data
  Feb. 9, 1989 [JP] Japan .................................. 1-30523
[51] Int. Cl.⁵ ........................ G02B 26/10; G03G 5/00
[52] U.S. Cl. .................................... 350/6.7; 355/211; 355/232
[58] Field of Search .................... 350/6.1, 6.5, 6.7, 6.8; 355/133, 211, 232, 233, 200, 317

[56]     References Cited
       U.S. PATENT DOCUMENTS

| 4,335,950 | 6/1982 | Gunzelmann et al. | 355/200 |
| 4,470,689 | 9/1984 | Nomura et al. | 355/211 |
| 4,598,993 | 7/1986 | Mizutani | 355/211 |
| 4,755,846 | 7/1988 | Kobayashi | 355/232 |
| 4,873,548 | 10/1989 | Kobayashi et al. | 355/211 |

FOREIGN PATENT DOCUMENTS 0255713 2/1988 European Pat. Off. .
147377 8/1984 Japan .
64-17076 1/1989 Japan .

Primary Examiner—Bruce Y. Arnold
Assistant Examiner—Loha Ben
Attorney, Agent, or Firm—Oblon, Spivak, McClelland, Maier & Neustadt

[57]     ABSTRACT

An optical scanner comprises a deflector for deflecting a light from a light source; an elongated cylindrical lens for correcting a shift in optical path; a photosensitive drum for performing a scanning operation thereon with respect to the light transmitted from the deflector through the cylindrical lens; and an integrally formed support device for positioning the cylindrical lens and the photosensitive drum. The cylindrical lens is held by a portion of a member for supporting the photosensitive drum. The support device comprises bearing recessed portions for receiving shaft portions disposed in the photosensitive drum at both ends thereof. The support device further comprises an elongated window frame for fixing the cylindrical lens thereto. The cylindrical lens is positioned in a predetermined position below the photosensitive drum so as to hold a parallel relation therebetween.

5 Claims, 5 Drawing Sheets

IMAGE FORMING APPARATUS

BACKGORUND OF THE INVENTION

1. Field of the Invention

The present invention relates to an image forming apparatus comprising an optical scanner in an electrophotographic recorder such as a laser printer, a copying machine, etc.

2. Description of the Related Art

A photosensitive drum of the electrophotographic recorder or a unit including the photosensitive drum is positioned and supported in a structure (box member) of an apparatus body called a frame base.

On the other hand, an optical scanner for performing a scanning operation on the photosensitive drum is disposed within a dedicated housing to maintain the accuracy in arrangement thereof. Accordingly, it is necessary that this housing is accurately manufactured and is not deformed by changes in environment such as temperature, humidity, etc., and has a high rigidity. From viewpoints of service and maintenance, the optical scanner is independently constructed as an optical unit in many cases and is fixed to the frame base by fastening a screw, etc.

As mentioned above, the photosensitive drum and the optical scanner are independent of each other in structure so that it is necessary to adjust an arrangement relation of these members. When the optical scanner is fixed to the frame base, there is a structure in which the position of the entire optical scanner is adjusted by an adjusting mechanism with respect to the photosensitive drum so as to hold the accuracy in arrangement between the optical scanner and the photosensitive drum.

However, when the accuracy in arrangement between the optical scanner and the photosensitive drum is set to be constant or more by adjusting the position of the entire optical scanner, the entire optical scanner is required to have a considerable large-sized structure so that it is difficult to use this structure.

In the future, it is anticipated to produce a product in which the diameter of the photosensitive drum is reduced and the recording picture element density is high. To make the product compact and provide a high recording picture element density, it is necessary to provide a technique for improving the accuracy in relative positioning between the optical scanner and the photosensitive drum.

As mentioned above, a recorded image is greatly deteriorated when the accuracy in relative arrangement between the optical scanner and the photosensitive drum is not good. This deterioration becomes severe as the diameter of the photosensitive drum is decreased and the recording picture element density is increased. Therefore, it is not possible to satisfy a recent requirement in which the scanner is made compact and has a high recording picture element density.

Further, in the above-mentioned technique, it is necessary to provide a position relation between the rotary polygon mirror and an f θ lens and further provide a predetermined accuracy in position between the rotary polygon mirror and the photosensitive drum in the case of an optical system for enlarging an image. In the case of an optical system for reducing an image, when an elongated lens is used, it is not necessary to improve the accuracy in position relation between the rotary polygon mirror and the f θ lens, but it is enough to provide a predetermined accuracy in position between the lens and the photosensitive drum.

SUMMARY OF THE INVENTION

It is therefore an object of the present invention to provide an image forming apparatus with an optical scanner for solving the curve of a scanning line and an unevenness of a pitch between scanning lines so as to record a clear image.

The above object of the present invention can be achieved by an optical scanner comprising a deflector for deflecting a light from a light source; an elongated cylindrical lens for correcting a shift in optical path; a photosensitive drum for performing a scanning operation thereon with respect to the light transmitted from the deflector through the cylindrical lens; and integrally formed support means for positioning the cylindrical lens and the photosensitive drum. The cylindrical lens is held by a portion of a member for supporting the photosensitive drum. The support means comprises bearing recessed portions for receiving shaft portions disposed in the photosensitive drum at both ends thereof. The support means further comprises an elongated window frame for fixing the cylindrical lens thereto. The cylindrical lens is positioned in a predetermined position below the photosensitive drums so as to hold a parallel relation therebetween.

In the above-mentioned structure, the elongated cylindrical lens for correcting the shift in optical path is accurately positioned with respect to the photosensitive drum.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical scanner of the present invention will next be described in detail with reference to the accompanying drawings.

Figure 1:
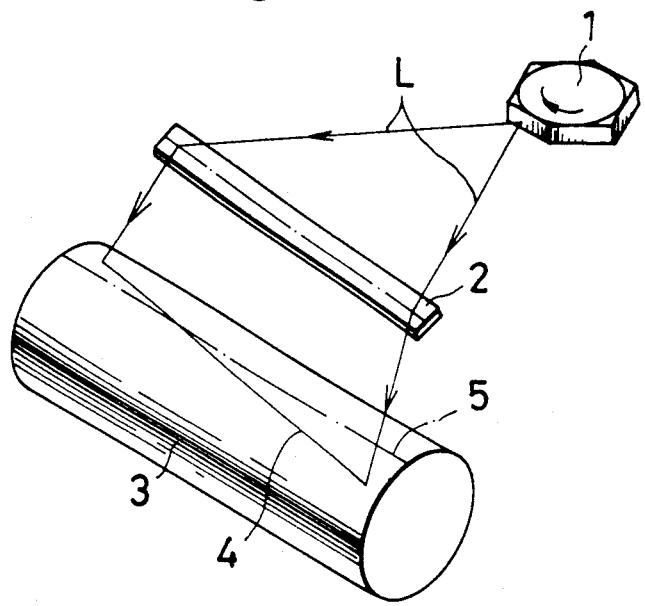
FIG. 1 is a perspective view showing a state in which a scanning line is shifted in an optical scanner.
Figure 2:
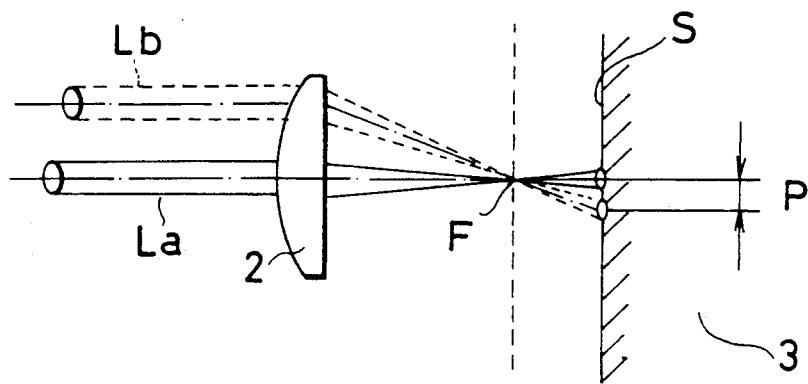
FIG. 2 is an explanatory view showing a state in which an optical path is shifted in the optical scanner.
Figure 3A:
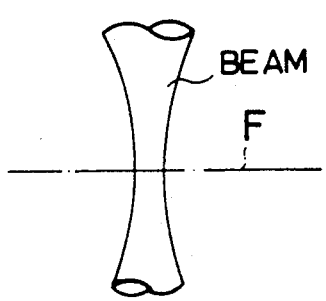
FIGS. 3a, 3b and 3c are explanatory views respectively showing a light beam shape, a beam spot shape and an energy distribution in ideal states thereof.
Figure 4A:
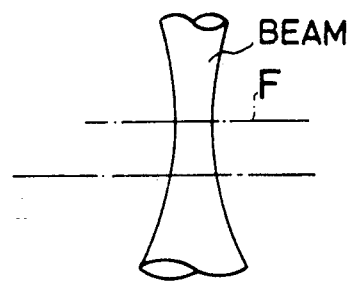
FIGS. 4a, 4b and 4c are explanatory views respectively showing the light beam shape, the beam spot shape and the energy distribution when the optical scanner and a photosensitive drum are shifted with respect to the relative position thereof.
Figure 3B:
Figure 4B:
Figure 3C:
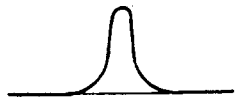
Figure 4C:
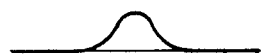

In an optical scanner shown in FIG. 1, an elongated cylindrical lens 2 is disposed to correct a shift in optical path of a scanning light beam L from a deflector 1. When a rotary axis of a photosensitive drum 3 is not parallel to the cylindrical lens 2 in a relative position relation therebetween, a latent image on the photosensitive drum 3 is curved since a scanning line 4 on the photosensitive drum 3 slantingly crosses an ideal scanning line 5 and thereby a scanning operation is slantingly performed on a circumferential face of the photosensitive drum 3. As shown in FIG. 2, when the optical path is shifted by a face inclination of the deflector 1, etc. from a normnal optical path La to an optical path Lb, a spot position S on the photosensitive drum 3 is shifted with respect to a position (focal position) F of a formed image in the optical system. Therefore, the shape of a beam spot is changed and a dispersion is caused with respect to an error in pitch P. FIGS. 3a, 3b and 3c respectively show a light beam shape, a beam spot shape and an energy distribution in ideal states thereof. FIGS. 4a, 4b and 4c respectively show the light beam shape, the beam spot shape and the energy distribution when the optical scanner and the photosensitive drum are shifted with respect to the relative position thereof.

Figure 5:
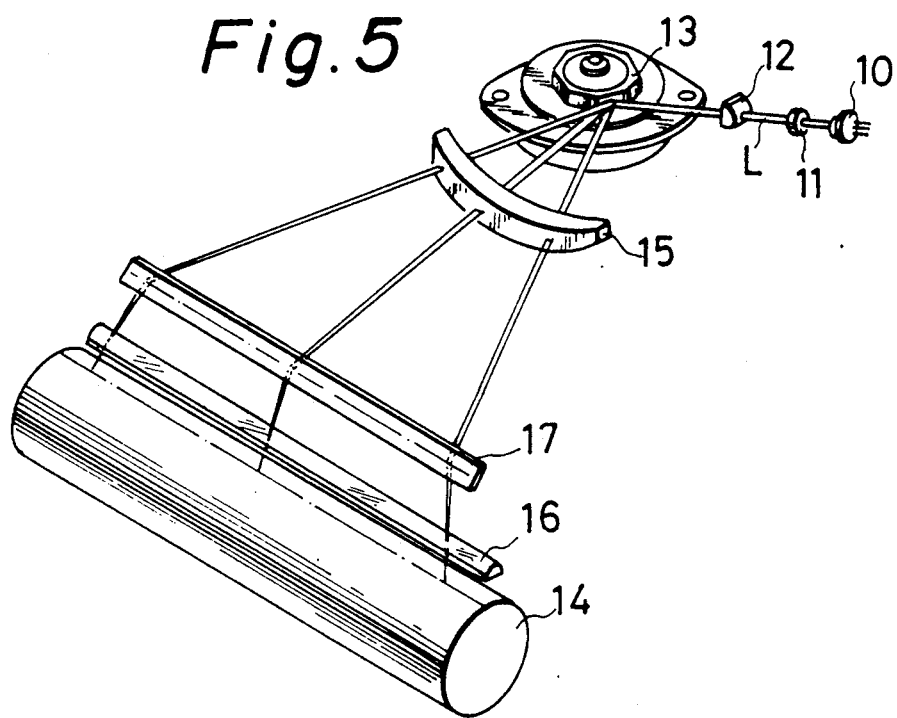
FIG. 5 is a schematic perspective view of an optically scanning system of a laser printer to which the present invention is applied.

FIG. 5 shows an optically scanning system of a laser printer to which the present invention is applied. A laser beam L emitted from a laser diode 10 as a light source becomes a parallel light beam by a collimator lens 11. This parallel light beam is incident onto a mirror face of a rotary polygon mirror (deflector) 13 rotated at a constant high speed through a first cylindrical lens 12. The reflected light from this mirror face is deflected by the rotation of the mirror face in a predetermined angle range every mirror face and the scanning operation is repeatedly performed in the same angle range. This laser beam is transmitted through an f θ lens 15 so as to linearly scan a formed image at a constant speed on a circumferential face of the photosensitive drum 14. The optical path of the transmitted laser beam is changed by a mirror 17 through a second cylindrical lens, i.e., an elongated cylindrical lens 16 for correcting the shift in optical path and the image is formed on the photosensitive drum 14. The cylindrical lens 16 is disposed to correct the shift in optical path caused by the inclination of each mirror face of the deflector 13 (this inclination is also caused by the inclination of the deflector 13). This cylindrical lens 16 is indispensable to the convergence of the laser beam in a constant position on the photosensitive drum 14, the uniformity of a pitch between scanning lines and the provision of the linearity of the scanning lines. There is a case in which the position relation between the cylindrical lens 16 and the mirror 17 is opposite with respect to the advancing direction of the light.

Figure 6:
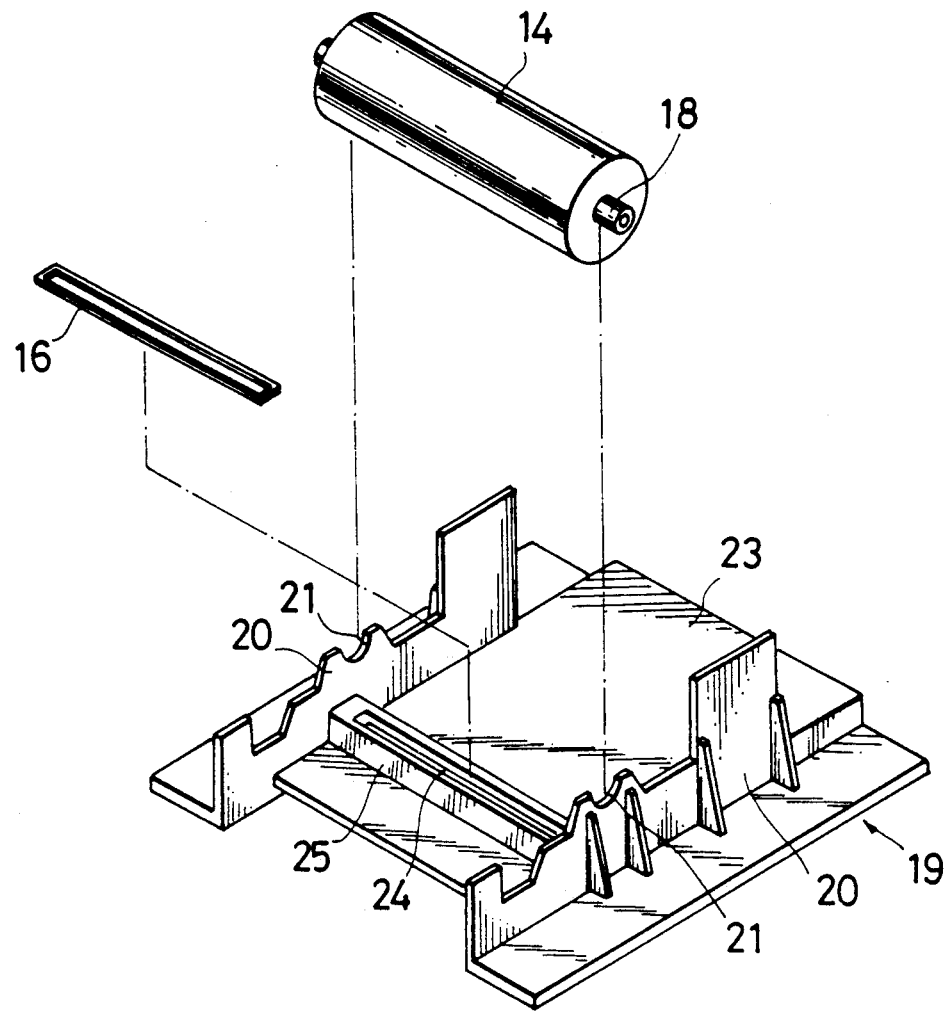
FIG. 6 is a perspective view showing a portion of the optical scanner in accordance with an embodiment of the present invention.

FIG. 6 is a perspective view of a portion of the optical scanner in accordance with the present invention. In this figure, shaft portions 18 of the photosensitive drum 14 at both ends thereof are respectively fitted into bearing recessed portions 21 disposed in both wall portions 20 of a body frame 19 of the printer and are horizontally supported by these recessed portions. A horizontal plate 23 is disposed between both wall portions 20 of the body frame 19 and also functions as a cover plate of a housing 22 of an optical unit shown in FIG. 8. An elongated window frame 25 is disposed on an upper face of this horizontal plate 23 and has a slit 24. The above cylindrical lens 16 for correcting the shift in optical path is fitted and fixed into this window frame 25. By this fixing operation, the cylindrical lens 16 is positioned in a predetermined position below the photosensitive drum 14 and the parallel relation therebetween is held.

Figure 7:
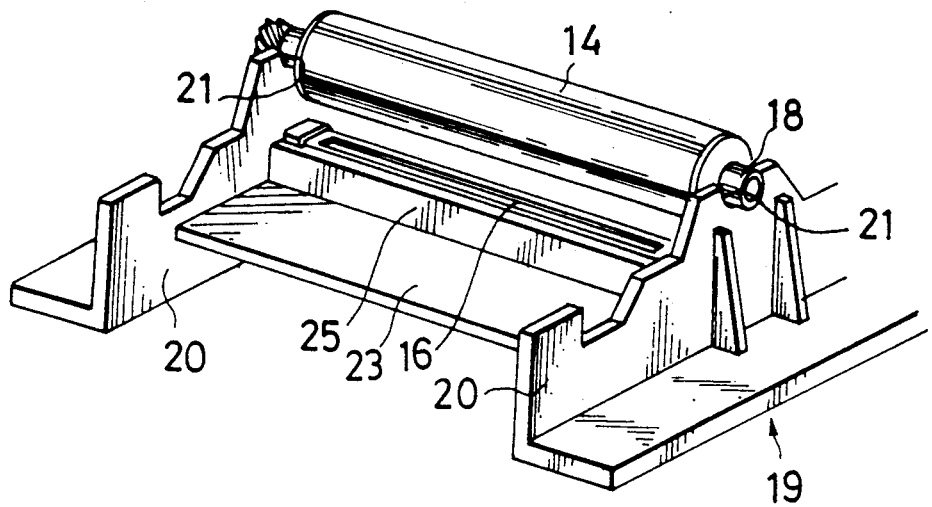
FIG. 7 is a view showing a state in which a cylindrical lens and a photosensitive drum in FIG. 6 are assembled.
Figure 8:
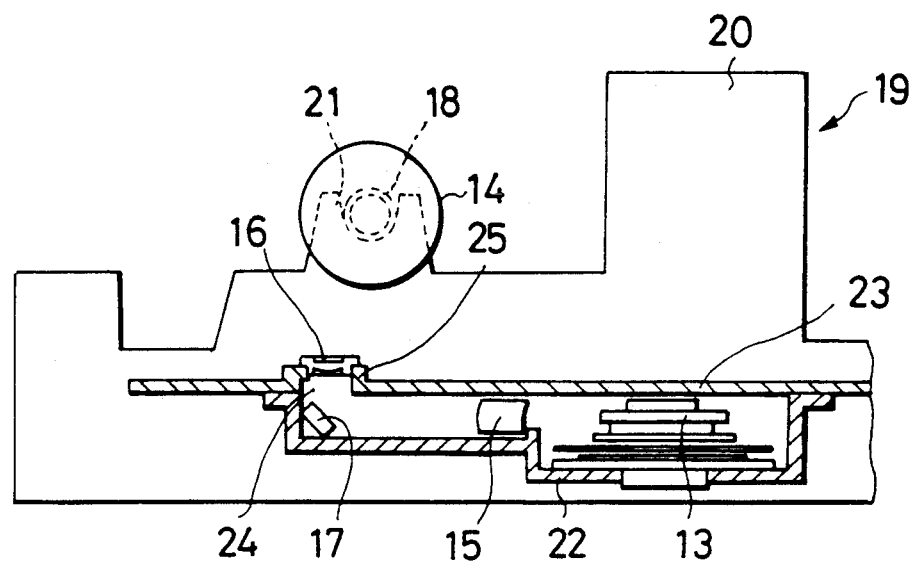
FIG 8. is a cross-sectional view of the assembled cylindrical lens and photosensitive drum.

FIG. 7 shows a state in which the photosensitive drum 14 and the positioned cylindrical lens 16 mentioned above are assembled. FIG. 8 is a cross-sectional view of the photosensitive drum 14 and the positioned cylindrical lens 16 assembled as above.

Figure 9:
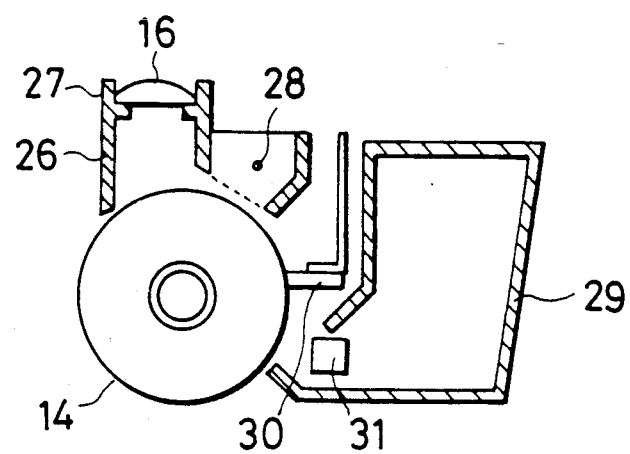
FIG. 9 is a cross-sectional view of the optical scanner in another embodiment of the present invention.

FIG. 9 shows another example of the optical scanner in accordance with the present invention. In this figure, a window frame 27 is disposed in a casing 26 of a photosensitive unit (further, a cleaning unit) including the photosensitive drum 14. The cylindrical lens 16 for correcting the shift in optical path is fitted into this window frame 27 and is positioned in a predetermined position above the photosensitive drum 14. In FIG. 9, reference numerals 28, 29, 30 and 31 respectively designate a charger for performing a charging operation, a tank for used toner, a cleaning blade and a roller for collecting toner.

Figure 10:
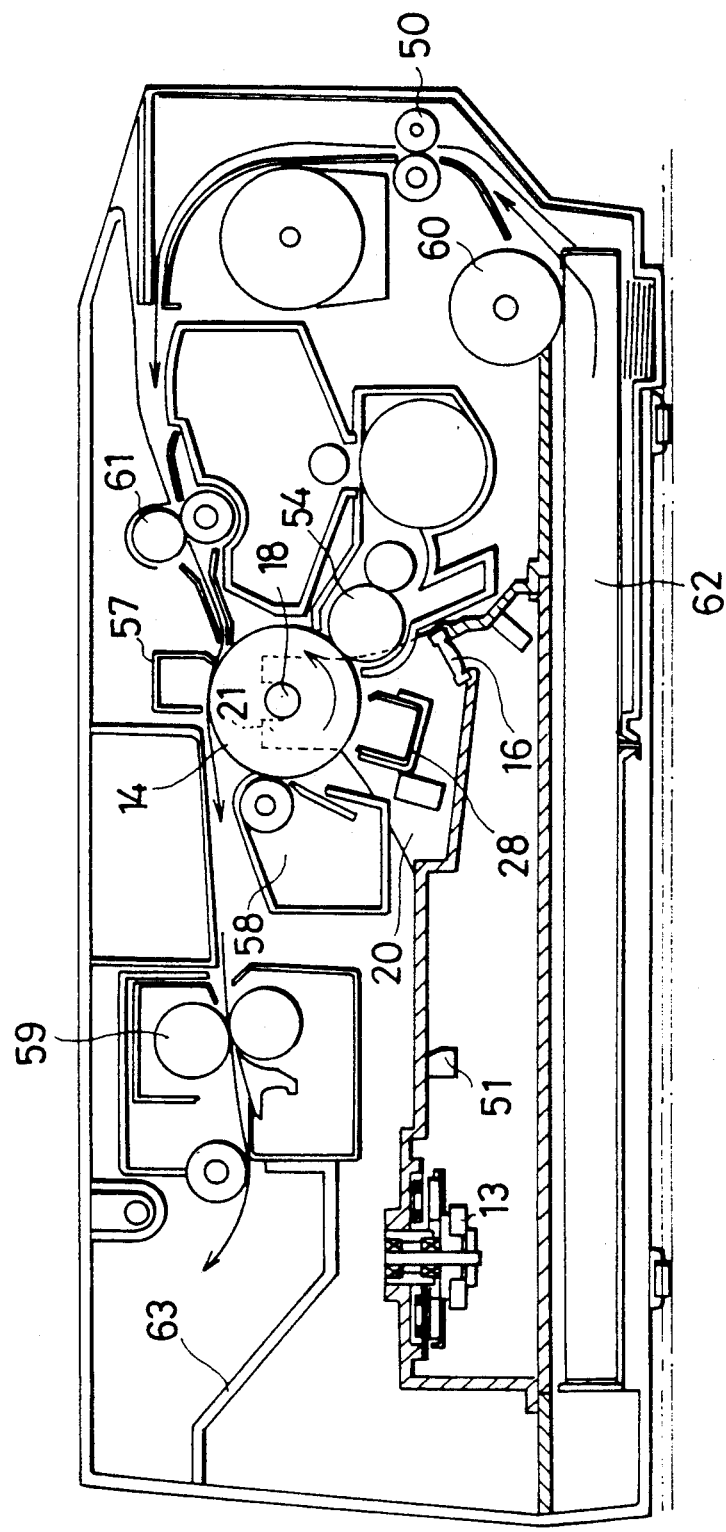
FIG. 10 is a cross-sectional view showing an entire laser printer provided with the optical scanner of the present invention.

FIG. 10 is a cross-sectional view of an entire laser printer to which the optical scanner of the present invention is applied. In FIG. 10, a sheet of paper within a paper cassette 62 is supplied upwards through a paper feed roller 60 and a pair of rollers 50 and is further supplied to resist rollers 61. The paper transmitted from the resist rollers 61 is transferred by a transfer charger 57 and is then supplied to a fixing device 59. The fixing device 59 performs a fixing operation with respect to this paper and the fixed paper is discharged onto a paper/discharging tray 63.

In the optical scanner shown FIG. 10, similar to the above case an image forming lens 51 and the rotary polygon mirror 13 are attached on one sideface of the body frame 19 integrally provided with both wall portions 18, the body frame 19 composes a supporting means, a light beam from the image forming lens 51 is incident to the elongated cylindrical lens 16 through the rotary polygon mirror 13 and is then incident onto the photosensitive drum 14. Thus, an image is formed on the paper on the photosensitive drum 14 and thereafter a developing operation with respect to this paper is performed by a developing device 54. The developed paper is supplied to the fixing device 59 through the transfer charger 57 and is fixed by this fixing device 59 and is then discharged onto the paper-discharging tray 63.

As mentioned above, in accordance with the present invention, the elongated cylindrical lens for correcting the shift in optical path is held by a portion of a member for supporting the photosensitive drum so that the cylindrical lens can be accurately positioned with respect to the photosensitive drum. Therefore, it is possible to solve the curve of a scanning line and the unevenness of a pitch between scanning lines in the optical scanner and record a clear image.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:
   an optical scanner including a deflector having mirror faces for deflecting a light from a light source, and an elongated cylindrical lens for correcting a shift in optical path caused by the inclination of each of the mirror faces of the deflector;
   a photosensitive drum for performing a scanning operation thereon with respect to the light transmitted from the deflector through the cylindrical lens; and
   a supporting means for supporting integrally all of the deflector, the cylindrical lens and the photosensitive drum, and for positioning all of the deflectors, the cylindrical lens and the photosensitive drum relative to each other.

2. An image forming apparatus as claimed in claim 1, wherein said photosensitive drum comprises a shaft and said supporting means comprises recessed portions for receiving both ends of the shaft of the photosensitive drum.

3. An image forming apparatus as claimed in claim 2, wherein said supporting means further comprises an elongated window frame for fixing the cylindrical lens thereto.

4. An image forming apparatus as claimed in claim 3, wherein the cylindrical lens is positioned in a predetermined position below the photosensitive drum so as to hold a parallel relationship therebetween.

5. An image forming apparatus as claimed in claim 4, wherein said optical scanner is applied to a printer.

* * * * *